United States Patent [19]

Brasen et al.

[11] Patent Number: 4,476,270

[45] Date of Patent: Oct. 9, 1984

[54] PROCESS FOR MAKING HIGH SOLIDS ACRYLIC DISPERSION LACQUER

[75] Inventors: Wallace R. Brasen, Chadds Ford, Pa.; Glenn E. Gerhardt; Basil V. Gregorovich, both of Wilmington, Del.

[73] Assignee: E. I. Du Pont de Nemours and Company, Wilmington, Del.

[21] Appl. No.: 485,752

[22] Filed: Apr. 18, 1983

Related U.S. Application Data

[62] Division of Ser. No. 278,847, Jun. 29, 1981, abandoned, and Ser. No. 157,455, Jun. 6, 1980, abandoned.

[51] Int. Cl.$^3$ ............................................. C08F 285/00
[52] U.S. Cl. ...................................... 524/364; 524/365; 524/376; 524/390; 524/504; 525/70
[58] Field of Search ............... 524/364, 365, 376, 390, 524/500, 504, 762, 765, 768, 850, 881

[56] References Cited

U.S. PATENT DOCUMENTS

| | | | |
|---|---|---|---|
| 3,660,537 | 5/1972 | Fryd | 524/533 |
| 3,784,501 | 1/1974 | Petit, Jr. | 260/31.8 M |
| 3,821,145 | 6/1974 | Walus | 525/80 |
| 4,180,529 | 12/1979 | Hofman | 525/85 |
| 4,255,308 | 3/1981 | Brasen | 525/77 |

FOREIGN PATENT DOCUMENTS 957792 11/1974 Canada ............................ 525/80

Primary Examiner—Christopher A. Henderson
Attorney, Agent, or Firm—Hilmar L. Fricke

[57] ABSTRACT

A process for making high solids acrylic dispersion lacquer coating composition having an acrylic polymer binder content of about 25–45% by weight in a nonaqueous medium; wherein the acrylic polymer is a blend of (1) Polymer A of methyl methacrylate and a polymerized monomer of allyl methacrylate, alkyl amino alkyl methacrylate or mixtures thereof;
(2) Copolymer B of methyl methacrylate and an alkyl acrylate having 6–12 carbon atoms in the alkyl group; and
(3) A graft copolymer of Polymer A which forms a backbone of the graft copolymer and Copolymer B attached to the backbone which forms side chains of the graft copolymer; and wherein the nonaqueous medium is a blend of
  (a) an aliphatic solvent which at 25° C. is a nonsolvent for Polymer A and a solvent for Copolymer B; and
  (b) a coalescing solvent for the binder;

the composition is useful as an exterior finish for automobiles and trucks.

8 Claims, No Drawings

PROCESS FOR MAKING HIGH SOLIDS ACRYLIC DISPERSION LACQUER

CROSS REFERENCE TO RELATED APPLICATIONS

This application is a divisional application of Ser. No. 06/157,455 filed June 6, 1980 now abandoned and a divisional application of Ser. No. 06/278,847 filed June 29, 1981 now abandoned.

BACKGROUND OF THE INVENTION

This invention is related to a coating composition and in particular to a higher solids acrylic dispersion lacquer coating composition in a nonaqueous medium.

Acrylic dispersion lacquer coating compositions are well-known and are shown in Fryd and Lee U.S. Pat. No. 3,660,537 issued May 2, 1972 and Lee and Victorius Canadian Pat. No. 957,792 granted Nov. 12, 1974. Compositions, such as described in the above patents, have been widely used in the automotive industry as a high quality exterior coating for automobiles and trucks and provide finishes of a high quality. However, these compositions do not comply with air pollution regulations that are being promulgated by many states and at the present state of the art cannot be brought into compliance with these regulations even with expensive pollution abatement equipment and techniques.

There is a need for a coating composition that will meet the following requirements: comply with current and future air pollution regulations with the use of pollution abatement equipment and techniques, form finishes on automobiles and trucks that have a good appearance, particularly good glamour, that are durable and weatherable and that can be spot repaired using conventional refinish procedures. The novel coating composition of this invention meets the above requirements.

SUMMARY OF THE INVENTION

A process for preparing a high solids acrylic polymer dispersion lacquer coating composition having an acrylic polymer binder content of about 25-45% by weight in a nonaqueous medium; wherein the acrylic polymer binder is a blend of
(1) Polymer A of polymerized methyl methacrylate and a monomer from the group of allyl methacrylate, alkyl amino alkyl methacrylate or mixtures thereof and having a weight average molecular weight, measured by gel permeation chromatography, of about 90,000–130,000;
(2) Copolymer B of polymerized methyl methacrylate and an alkyl acrylate having 6–12 carbon atoms in the alkyl group and having a weight average molecular weight, measured as above, of 20,000–40,000; and
(3) A graft copolymer of Polymer A which forms a backbone of the graft copolymer and Copolymer B attached to the backbone which forms side chains of the graft copolymer;
wherein the nonaqueous medium is a blend of
(a) an aliphatic solvent which at 25° C. is a nonsolvent for Polymer A and a solvent for Copolymer B; and
(b) a coalescing solvent which at 50° C. is a solvent for the binder and at 25° C. is a nonsolvent for the binder;
wherein the process comprises the following steps:
Step (1) polymerizing the monomers of Polymer A and backbone of graft copolymer in the presence of an azo polymerization catalyst and a coalescing solvent, and low boiling solvent while maintaining a reaction temperature of less than 95° C.;
Step (2) adding the monomers of Copolymer B and the side chains of the graft copolymer and a peroxy polymerization catalyst and polymerizing said monomers to form Copolymer B and side chains on the graft copolymers; and
Step (3) adding sufficient aliphatic nonsolvents for Polymer A to form a dispersion.

DESCRIPTION OF THE PREFERRED EMBODIMENTS

The acrylic dispersion lacquer coating composition has an acrylic polymer binder content of about 25-45% by weight and is in a nonaqueous medium. The acrylic polymer binder is a blend of a Polymer A, a Copolymer B and a graft copolymer having a backbone and side chains attached thereto of Polymer A which forms the backbone and Copolymer B forms the side chains.

In the dispersion lacquer, Copolymer B is in solution. Polymer A is not in solution but is kept dispersed by the graft copolymer. The dispersion has a relatively high polymer solids content and a viscosity that allows spray application. Upon application of the dispersion to a substrate, a substantial amount of aliphatic nonsolvent evaporates and the dispersion is converted to a relatively high viscosity liquid on the substrate. This high viscosity liquid does not sag or flow on the substrate upon application. On baking of the coating, the remaining solvents coalesce the polymers into a smooth, glossy and continuous finish.

The acrylic polymer binder comprises about 25-45% by weight of Polymer A, 5-25% by weight of Copolymer B and 40-60% by weight of the graft copolymer. One particularly preferred acrylic binder comprises 35% by weight of Polymer A, 15% by weight of Copolymer B and 50% by weight of graft copolymer.

Polymer A is comprised of polymerized methyl methacrylate and allyl methacrylate, and optionally an alkyl amino alkyl methacrylate. Typically, Polymer A is comprised of 90-99.5% by weight, based on the weight of Polymer A, of methyl methacrylate, 0.1-5% of allyl methacrylate and 0.4-5% by weight of alkyl amino alkyl methacrylate. Polymer A has a weight average molecular weight of about 90,000–130,000 and preferably 100,000–115,000.

The molecular weights of polymers referred to herein are determined by gel permeation chromatography using polymethyl methacrylate as a standard.

One preferred composition of Polymer A comprises 97-99.5% by weight of methyl methacrylate, 0.4-1% by weight of diethylaminoethyl methacrylate and 0.1-2% by weight of allyl methacrylate having a weight average molecular weight of 100,000–115,000.

Typical alkyl amino alkyl methacrylates that are used to form Polymer A are: dimethylaminoethyl methacrylate, diethylaminoethyl methacrylate, dipropylaminoethyl methacrylate, methylethylaminoethyl methacrylate, butylaminoethyl methacrylate, tertiarybutylaminoethyl methacrylate, diethylaminopropyl methacrylate, diethylaminobutyl methacrylate, diethylaminopentyl methacrylate, diethylaminohexyl methacrylate and the like. Diethylaminoethyl methacrylate is preferred to form a quality coating composition.

Copolymer B is comprised of polymerized methyl methacrylate and an alkyl acrylate having 6–12 carbon atoms in the alkyl group. Typically, Copolymer B is comprised of about 40–60% by weight of methyl methacrylate and 40–60% by weight of the alkyl acrylate. Copolymer B has a weight average molecular weight of about 20,000–40,000. One preferred composition of Copolymer B comprises 40–60% by weight of methyl methacrylate and 40–60% by weight of 2-ethylhexyl acrylate.

Typical alkyl acrylates that are used to form Copolymer B are: hexyl acrylate, 2-ethylhexyl acrylate, nonyl acrylate, decyl acrylate, lauryl acrylate and the like. 2-Ethylhexyl acrylate is preferred to form a high quality product.

The graft copolymer has a backbone of Polymer A and side chains of Copolymer B attached thereto. Generally, the graft copolymer contains about 50–80% by weight of Polymer A and 20–50% by weight of Copolymer B.

The nonaqueous medium used in the composition is a blend of (1) an organic aliphatic solvent which at 25° C. is a nonsolvent for Polymer A and remains a nonsolvent at elevated temperatures for Polymer A and is a solvent for Copolymer B at 25° C. and (2) a coalescing solvent which at 50° C. and above is a solvent for the binder and form a high quality finish. At 25° C. the coalescing solvent preferably is not a solvent for the binder as only a small percentage of the binder may solubilized or swollen by the coalescing solvent. Generally, the nonaqueous medium of the composition contains about 35–65% by weight, based on the weight of the nonaqueous medium, of the aliphatic solvent and 35–65% by weight of coalescing solvent.

If the aliphatic solvent and the coalescing solvent are not compatible up to about 15% by weight, based on the weight of the nonaqeous medium, of a bridging solvent can be added to make the aliphatic solvent and coalescing solvent compatible. Usually 5–10% by weight of a bridging solvent is used.

Also, it may be desirable to add up to 20% by weight, based on the weight of the nonaqueous medium, of a coalescing solvent which is a solvent for the binder at 25° C. The use of these coalescing solvents results in lower binder solids content of the composition and the use of these solvents is kept to a minimum.

Typical aliphatic solvents are petroleum fractions that have a boiling point range of about 100°–160° C. and may contain up to about 10% by weight of aromatic solvents.

Typical bridging solvents are toluene, xylene, high solvency hydrocarbons having a boiling point range of 180°–220° C.

Typical coalescing solvents which are solvents for the binder at 50° C. but not solvents at 25° C. are as follows:
diethylene glycol monohexylether,
diethylene glycol 2-ethyl hexyl ether,
ethylene glycol monobutylether, 2-ethyl hexanol, isooctylalcohol and other 8 carbon atoms alcohols, slow evaporating high solvency hydrocarbon having a boiling point of 182°–219° C.,
2-(2-butoxy-ethoxy)isopropanol, 2-(2-methoxy-isopropoxy)isopropanol, 2-methoxy isopropanol, 2-propoxy isopropanol, 2-butoxy isopropanol.

Typical coalescing solvents which are solvents for the binder at 25° C. are as follows: diethylene glycol monobutyl ether acetate, diethylene glycol monohexyl ether acetate, diethylene glycol 2-ethyl hexyl ether acetate, ethylene glycol monobutyl ether acetate, ethylene glycol 2-ethyl hexyl ether acetate, diethyl phthalate, isobutyrate ester of 2,2,4-trimethyl-1,3-pentanediol and a mixture of methyl esters of succinic acid, glutaric acid and adipic acid.

The high solids acrylic polymer dispersion is prepared according to the following preferred process:

Step (1) About 50–70% by weight of the monomers for Polymer A and the backbone of the graft copolymers, i.e., methyl methacrylate monomers and allyl methacrylate and/or alkyl aminoalkyl methacrylate monomers, are charged into a polymerization vessel with a coalescing solvent such as diethylene glycol monohexyl ether or 2-ethyl hexanol, optionally, a bridging solvent such as toluene and other low boiling solvents such as methanol or a blend of acetone and petroleum ether which control the reflux temperatures of the resulting reaction mixture to less than 95° C. The resulting mixture is heated to its reflux temperature of less than about 95° C., and preferably about 85°–95° C., and held at this temperature for 2–10 minutes;

Step (2) About 0.1–2% by weight, based on the weight of Polymer A and the backbone of the graft copolymer, of an azo polymerization catalyst, such as azobisisobutyronitrile is added with a coalescing solvent to the reaction mixture and heated to its reflux temperature for about 5–10 minutes;

Step (3) The remaining 30–50% by weight of the monomers for Polymer A and the backbone of the graft copolymer and a coalescing solvent such as, diethylene glycol monohexyl ether, and about 0.1–2% by weight, based on the total weight of the monomers for Polymer A and the backbone of the graft copolymer, of the aforementioned azo polymerization catalyst with a coalescing solvent as described above are slowly added to the reaction mixture at a uniform rate over a 50–120 minute period while maintaining the reaction mixture at its reflux temperature but below 95° C.

Step (4) About 40–60% by weight of the monomers such as methyl methacrylate monomers and 2-ethylhexyl acrylate monomers for Copolymer B and the side chains of the graft copolymer and about 0.5–2% by weight, based on the weight of the above monomers, of a peroxy polymerization catalyst such as t-butyl peroxy pivalate for graft polymer formation are added and the reaction mixture is held at its reflux temperature for about 5–20 minutes;

Step (5) The remaining 40–60% by weight of the above monomers of step (4) with the above peroxy polymerization catalyst in the same amount are added at a uniform rate over a 20–50 minute period while maintaining the reaction mixture at its reflux temperature;

Step (6) About 2–10% by weight, based on the weight of the monomers for Polymer A, Copolymer B and the graft copolymer, of methyl methacrylate monomer with about 0.1–1% by weight of azo polymerization catalyst and the above peroxy polymerization catalyst are added at a uniform rate over a 5–30 minute period and the reaction mixture is held at its reflux temperature for about 10–30 minutes;

Step (7) About 15–25% by weight, based on the weight of the reaction mixture, of an aliphatic hydrocarbon solvent which is a nonsolvent for Polymer A and the backbone of the graft copolymer is added at a uniform rate over a 40–60 minute period; and Step (8) About 5–10% by weight, based on the weight of the reaction mixture, of an aliphatic hydrocarbon solvent of step (7) containing about 0.1-10% by weight based on the weight of the solvent, of a peroxy polymerization catalyst described above in step (4) are added over a 40-60 minute period and the resulting reaction mixture is cooled to an ambient temperature.

Generally, the coating composition is pigmented. Pigments are usually used in a pigment to binder weight ratio of about 1/100 to about 150/100.

The pigments are introduced into the coating composition by first forming a mill base with a compatible dispersing resin by conventional techniques such as sand grinding, attritor grinding or ball milling. Then the mill base is blended with the film-forming binder as shown in the Examples. Polymers such as those described in Orvis U.S. Pat. No. 3,790,523 issued Feb. 5, 1974 (Column 2, line 65—Column 3, line 28) and cellulose acetate butyrate can be used as dispersing resins.

The following are examples of the great variety of pigments which are used in the coating composition: metallic oxides, preferably titanium dioxide, zinc oxide, and the like, metal hydroxides, metal flakes, such as aluminum flake, bronze flake, "Afflair" pigments, i.e., mica-coated with titanium dioxide, metal powders, chromates, such as lead chromates, sulfides, sulfates, carbonates, carbon black, silica, talc, china clay, phthalocyanine pigments such as copper phthalocyanine blue, iron blues, organic reds, organic maroons, and other organic pigments.

About 0.1 to 10% by weight, based on the weight of the binder, in addition to the other binder constituents of ultraviolet light stabilizers can be added to the coating composition. Typical ultraviolet light stabilizers are described hereinafter. It may also be desirable to add about 0.1-5% by weight, based on the weight of the binder, of an antioxidant, described hereinafter, to the coating composition.

About 0.1-5% by weight, based on the weight of the binder, of iron pyrophosphate can be added to the coating composition to improve certain properties of the composition such as improved resistance to deterioration of finishes caused by high humidity. One typically useful iron pyrophosphate is prepared according to the teachings of Jackson U.S. Pat. No. 3,074,895 issued Jan. 22, 1963.

About 0.01-1% by weight, based on the weight of the binder, of silicone anticratering agents can be used such as polyalkene oxide siloxane and silicone glycol copolymers.

The coating composition can contain about 15-30% by weight, based on the weight of the binder, of a plasticizer. Typical plasticizers are for example, phthalate esters such as butylbenzyl phthalate, dibutyl phthalate, 2-ethylhexylbenzyl phthalate, dicyclohexyl phthalate, dibenzyl phthalate, butylcyclohexyl phthalate, di-2-ethylhexyl ester of hexamethylene diphthalate, di-(methylcyclohexyl)phthalate. One preferred plasticizer of this group is butylbenzyl phthalate. Other plasticizers that can be used are mixed benzoic acid and fatty oil acid esters of pentaerythritol, poly(propylene adipate) dibenzoate, diethylene glycol dibenzoate, ethylene glycol adipate benzoate and neopentyl glycol adipate benzoate. Other plasticizers are tetrabutylthiodisuccinate, butylphthalyl butyl glycolate, acetyltributyl citrate, dibenzyl sebacate, tricresyl phosphate, toluene ethylsulfonamide.

Preferred plasticizers are coconut oil/ethylene glycol phthalate resins and ethylene glycol phthalate/ethylene glycol benzoate/ethylene glycol adipate resins.

The coating composition of this invention can be applied to a variety of substrates such as metal, e.g., phosphatized steel, uncoated steel, aluminum, fiberglass reinforced with resins, plastics, rigid polyurethanes, rigid synthetic rubbers and the like. These substrates are coated with a primer and usually a thin sealer coat is applied over the primer to enhance adhesion of the composition to the primer. Application of the coating composition is done by the usual methods of spraying, electrostatic spraying, dipping, brushing, flow coating and the like. The coating composition can be reduced to an application viscosity by the addition of a coalescing solvent/nonsolvent blend. A typical reducing solvent blend comprises a petroleum naphtha and diethylene glycol monohexyl ether in about a 50/50 weight ratio. Generally, the composition is not reduced below 25% solids based on the binder. Preferably the composition is reduced to 30-35% solids based on binder.

After application, the coating is baked at about 150°-225° C. for 15 to 45 minutes. The resulting finish is about 0.1-5 mils thick, preferably, 1-3 mils thick, and has a good gloss. The finish does not yellow on baking and gives a hard, durable, scratch resistant, gasoline-resistant, weather-resistant, alkali-resistant, glossy finish which is suitable for automobile and truck bodies.

Another aspect of this invention is to utilize the composition as a clear coat/color coat finish for substrates. In this finish, a clear coat top layer is in firm adherence to a color coat layer that is in adherence with a substrate. The clear coat is a transparent film of the coating composition of this invention and the color coat is the coating composition of this invention containing pigments in a pigment to binder ratio of about 1/100 to 150/100 and other additives.

Optionally, the color coat can contain about 0.1-20% by weight, based on the weight of the binder of the color coat, of an ultraviolet light stabilizer. Another option is that the color coat and the clear coat each can contain about 0.5-20% by weight, based on the weight of the binder of the coat, of an ultraviolet light stabilizer and optionally, about 0.1-5% by weight, based on the weight of the binder of the coat, of an antioxidant; wherein the weight ratio of ultraviolet light stabilizer to antioxidant is about 1:1 to about 50:1.

Preferred, to form a durable finish, both the clear coat and the color coat contain about 0.5-8% by weight of an ultraviolet light stabilizer along with about 0.1-1% by weight of the antioxidant.

The thickness of the fully cured color coat and clear coat can vary. Generally, the color coat is about 0.4-1.5 mils thick and preferably 0.6-1.0 mils thick and the clear coat is about 0.5-6.0 mils thick and preferably 0.8-1.5 mils thick.

Any of the aforementioned conventional pigments can be used in the color coat including metallic flake pigments. The clear coat can also contain transparent pigments, i.e., pigments having the same or similar refractive index as the binder of the clear coat and are of a small particle size of about 0.015-50 microns. Typical pigments that can be used in the clear coat in a pigment to binder weight ratio of about 1/1000 to 10/100 are inorganic siliceous pigments, such as silica pigments. These pigments have a refractive index of about 1.4-1.6.

Typical ultraviolet light stabilizers that are useful are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',4'-dihydroxybenzoyl)-triazoles, substituted benzotriazoles such as hydroxy-phenyl triazoles and the like.

Triazines such as 3,5-dialkyl-4-hydroxy phenyl derivatives of triazine, sulfur containing derivatives of diallyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis(2'-hydroxybenzoyl)benzene, metal derivatives of 3,5-di-t-butyl-4-hydroxy phenyl propionic acid, asymmetrical oxalic acid diarylamides, alkylhydroxyphenyl-thioialkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

Typical antioxidants that are useful are as follows: tetrakis alkylene(di-alkyl hydroxy aryl)alkyl ester alkanes such as tetrakis methylene 3(3',5'-dibutyl-4'hydroxyphenyl)propionate methane, reaction product of p-amino diphenylamine and glycidyl methacrylate, reaction product of n-hexyl-N'-phenyl-p-phenylene diamine and glycidyl methacrylate, pentaerythritol tetrakis(thioglycolate), trimethylol propane tris(thioglycolate), trimethylol ethane tris(thioglycoate), N-(4-anilino phenyl)acrylamide and the like.

One preferred combination of ultraviolet light stabilizer and antioxidant is 2-hydroxy-4-dodecyloxy benzophenone or a substituted 2(2-hydroxyphenyl)benzotriazole and tetrakis methylene 3(3',5'-dibutyl-4'hydroxyphenyl)propionate methane.

The clear coat/color coat finish is applied by conventional spraying techniques and preferably the clear coat is applied to the color coat while the color coat is still wet. Other conventional application techniques as described above can be used. The finish is then baked at the above temperature.

The following Examples illustrate the invention. All parts and percentages are on a weight basis unless otherwise indicated. All molecular weights are determined by gel permeation chromatography using polymethyl methacrylate as a standard.

EXAMPLE 1

An acrylic polymer dispersion is prepared as follows:

| | Parts by Weight |
|---|---|
| Portion 1 | |
| Methyl methacrylate monomer | 151.84 |
| Diethyl aminoethyl methacrylate monomer | 2.48 |
| Allyl methacrylate monomer | 0.37 |
| Acetone | 10.83 |
| Petroleum ether | 7.37 |
| Toluene | 45.86 |
| Diethylene glycol monohexyl ether | 53.88 |
| Portion 2 | |
| Solvent of mixed methyl esters of succinic acid, glutaric acid and adipic acid | 16.90 |
| Azobisisobutyronitrile | 0.74 |
| Portion 3 | |
| Methyl methacrylate monomer | 98.21 |
| Allyl methacrylate monomer | 0.87 |
| Acetone | 3.63 |
| Diethylene glycol monohexyl ether | 34.16 |
| Petroleum ether | 2.50 |
| Solvent of mixed methyl esters of succinic acid, glutaric acid and adipic acid | 27.58 |
| Azobisisobutyronitrile | 1.22 |
| Portion 4 | |
| 2-Ethylhexyl acrylate monomer | 22.93 |
| Methyl methacrylate monomer | 5.18 |
| Petroleum ether | 4.59 |
| Diethylene glycol monohexyl ether | 13.40 |
| 75% solution of t-butyl peroxy pivalate in mineral spirits | 0.33 |
| Portion 5 | |
| 2-Ethylhexyl acrylate monomer | 22.93 |
| Methyl methacrylate monomer | 3.44 |
| Petroleum ether | 2.29 |
| Diethylene glycol monohexyl ether | 13.37 |
| 75% solution of t-butyl peroxy pivalate in mineral spirits | 0.33 |
| Portion 6 | |
| Methyl methacrylate monomer | 14.22 |
| Diethylene glycol monohexyl ether | 9.27 |
| Azobisisobutyronitrile | 0.32 |
| 75% solution of t-butyl peroxyl pivalate in mineral spirits | 0.16 |
| Portion 7 | |
| Aliphatic hydrocarbon (petroleum fraction having essentially the same evaporation rate as mineral spirits but limited to 8% of 8 carbon atom aromatics and above, aniline point measured by ASTM-D 1012-62 of 60 to 67° C.) | 165.09 |
| Portion 8 | |
| Aliphatic hydrocarbon (described above) | 57.32 |
| 75% solution of t-butyl peroxy pivalate in mineral spirits | 0.28 |
| Total | 787.85 |

Portion 1 is charged into a reaction vessel equipped with a stirrer, reflux condenser, thermometer, heat source and a nitrogen inlet. During the reaction, the constituents in the vessel are under constant agitation. Portion 1 is heated to its reflux temperature and held for 5 minutes at this temperature. The heat source is turned off. The heat resulting from the reaction maintains the reaction temperature of the resulting reaction mixture. Portion 2 is added to the reaction mixture and the mixture is held for 10 minutes at its reaction temperature. Portion 3 is added to the reaction mixture at a uniform rate over a 80 minute period and then the reaction mixture is held at its reaction temperature for an additional 15 minutes. Portion 4 is added to and the reaction mixture which is held at its reaction temperature for 15 minutes. Portion 5 is added to the reaction mixture at a uniform rate over a 35 minute period. Portion 6 is then added at a uniform rate over a 20 minute period and the reaction mixture is held at its reaction temperature for an additional 20 minutes. Portion 7 is then added at a uniform rate over a 50 minute period. Portion 8 is then added over a 50 minute period and the reaction mixture is cooled to 50° C. and then filtered.

The resulting acrylic polymer dispersion has a polymer weight solid content of 40% and contains about 35% of a polymer of methyl methacrylate/allyl methacrylate/diethyl aminoethyl methacrylate in a weight ratio of about 98.4/0.6/1.0 and has a weight average molecular weight of about 110,000, 15% of a copolymer of 2-ethylhexyl acrylate/methyl methacrylate in a 1/1 weight ratio having a weight average molecular weight of about 30,000 and 50% of a graft copolymer of the above polymer which forms the backbone of the graft copolymer and the above copolymer which forms side chains of the graft copolymer.

The following mill bases are prepared:

| White Mill Base | Parts By Weight |
|---|---|
| Portion 1 | |
| Polymeric Dispersant Solution (62% polymer solids in toluene in which the polymer comprises methyl methacrylate/2-ethylhexyl acrylate having a number average molecular weight of 4500 and further reacted with mercaptoethanol, a polyisocyanate and ammonia) | 8.44 |
| Toluene | 11.56 |
| Ethylene glycol monoethyl ether acetate | 2.00 |
| Portion 2 | |
| Titanium dioxide pigment | 68.00 |
| Portion 3 | |
| Acrylic polymer dispersion (prepared above) | 2.00 |
| Portion 4 | |
| Hydrocarbon Solvent | 8.00 |
| Total | 100.00 |

Portion 1 is charged into a mixer and mixed for 5 minutes. Portion 2 is added and mixed for 2 hours and then Portion 3 is added and mixed for 30 minutes. Portion 4 is added and mixed for 30 minutes. The resulting mixture is then ground for one pass through a conventional 8 gallon sand mill containing 70 pounds of sand to form a white mill base.

| Green Mill Base | Parts By Weight |
|---|---|
| Portion 1 | |
| Ethylene glycol monoethyl-ether acetate | 10.00 |
| Toluene | 20.00 |
| Polymeric dispersant solution (described above) | 15.00 |
| Acrylic polymer dispersion (prepared above) | 15.00 |
| VM and P Naphtha | 25.00 |
| Portion 2 | |
| "Monastral" green pigment B (phthalocyanine pigment) | 15.00 |
| Total | 100.00 |

Portion 1 is premixed and then Portion 2 is added and the resulting composition is ground two passes in a conventional 8 gallon sand mill containing 70 pounds of sand at the rate of 30 gallons per minute to form a dispersion.

| Yellow Mill Base | Parts By Weight |
|---|---|
| Portion 1 | |
| Polymeric dispersant solution (described above) | 28.40 |
| Toluene | 12.60 |
| Portion 2 | |
| Ferrite Yellow Pigment (iron oxide pigment) | 46.00 |
| Portion 3 | |
| Acrylic Polymer dispersion (prepared above) | 3.00 |
| VM and P Naphtha | 10.00 |
| Total | 100.00 |

Portion 1 is charged into a mixing vessel and mixed for 10 minutes and then Portion 2 is added and mixed for 1 hour. Portion 3 is added and mixed for 10 minutes and then Portion 4 is added and mixed for 30 minutes. The resulting mixture is charged into a sand mill, described above, and ground for one pass to form a dispersion.

| Blue Mill Base | Parts By Weight |
|---|---|
| Portion 1 | |
| Polymeric dispersant solution (described above) | 15.00 |
| Toluene | 36.00 |
| Portion 2 | |
| "Monastral" blue flake (phthalocyanine pigment) | 15.00 |
| Portion 3 | |
| Acrylic polymer dispersion (prepared above) | 20.00 |
| Portion 4 | |
| VM and P Naphtha | 14.00 |
| Total | 100.00 |

Portion 1 is charged into a mixing vessel and mixed for 10 minutes and then Portion 2 is added and mixed for 30 minutes. Portion 3 is added and mixed for 30 minutes and Portion 4 then is added and mixed for 30 minutes. The resulting mixture is charged into a conventional sand mill, described above, and ground for two passes to form a dispersion.

| Black Mill Base | Parts By Weight |
|---|---|
| Portion 1 | |
| Polymeric dispersant solution (described above) | 38.00 |
| Toluene | 17.00 |
| VM and P Naphtha | 20.00 |
| Acrylic polymer dispersion (described above) | 5.00 |
| Portion 2 | |
| Carbon black pigment | 20.00 |
| Total | 100.00 |

Portion 1 is premixed and Portion 2 is added and the resulting mixture is charged into an attritor containing ⅛ inch steel balls as the grinding media and ground for 3 hours to a 0.5 mil fineness.

| Aluminum Mill Base | Parts By Weight |
|---|---|
| Portion 1 | |
| Polyester resin plasticizer (85% of a polyester resin of | 11.50 |

-continued

| Aluminum Mill Base | Parts By Weight |
|---|---|
| ethylene glycol adipate/ethylene glycol benzoate/ethylene glycol phthalate having an acid No. of less than 10 and 15% of butylbenzyl phthalate) | |
| Toluene | 8.50 |
| Acrylic polymer dispersion (prepared above) | 15.00 |
| Portion 2 | |
| Aluminum flake paste (65% solids aluminum flake in aliphatic solvent) | 12.50 |
| Portion 3 | |
| Acrylic polymer resin dispersion (described above) | 52.50 |
| Total | 100.00 |

Portion 1 is charged into a mixing vessel and mixed for 5 minutes. Portion 2 is added and mixed for 1 hour and then Portion 3 is added and mixed for 3 hours to form a dispersion.

A white high solids acrylic dispersion lacquer is formed as follows:

| | Parts By Weight |
|---|---|
| Portion 1 | |
| Acrylic polymer dispersion (prepared above) | 625.93 |
| Polyester resin plasticizer solution (described above) | 25.73 |
| Alkyd resin plasticizer solution (85% of a coconut oil/ ethylene glycol phthalate resin having an acid No. less than 10 and 15% butyl benzyl phthalate) | 25.73 |
| Butyl benzyl phthalate | 18.01 |
| Flow control agent (1% solution of light weight silicone oil in xylene) | 0.29 |
| Portion 2 | |
| White Mill Base (prepared above) | 190.16 |
| Yellow Mill Base (prepared above) | 0.86 |
| Black Mill Base (prepared above) | 0.29 |
| Total | 887.00 |

Portion 1 is charged into a mixing vessel and mixed for 5 minutes and then Portion 2 is added and mixed for 1 hour to form the lacquer.

The above lacquer is reduced to a 34% volume solids by mixing the lacquer with the following thinner:

The reduced lacquer is sprayed into phosphatized steel panels primed with an alkyd resin primer and coated with a sealer. Three coats are sprayed onto the panels and the panels are baked at about 165° C. for 30 minutes to provide a finish that is about 2.2 mils thick. The resulting finish is smooth, glossy, water resistant, gasoline resistant, chip resistant, weatherable and has excellent distinctness of image. The lacquer is useful as a high quality automotive finish.

A blue metallic high solids acrylic dispersion lacquer is formed as follows:

| | Parts By Weight |
|---|---|
| Portion 1 | |
| Hydrocarbon solvent (described above) | 25.05 |
| Acrylic polymer dispersion (prepared above) | 616.59 |
| Polyester resin plasticizer solution (described above) | 28.55 |
| Alkyd resin plasticizer solution (described above) | 34.41 |
| Butyl benzyl phthalate | 27.23 |
| 2-Hydroxyl-4-dodecyloxy benzophenone | 1.70 |
| Flow control agent (described above) | 0.24 |
| Portion 2 | |
| Aluminum Mill Base (prepared above) | 50.89 |
| Blue Mill Base (prepared above) | 10.80 |
| Black Mill Base (prepared above) | 0.32 |
| Green Mill Base (prepared above) | 0.22 |
| Total | 796.00 |

The above lacquer is reduced to a 34% volume solids by mixing the lacquer with the above thinner. The reduced lacquer is sprayed onto phosphatized steel panels primed and sealed as described above using the same spraying procedures and then the coated panels are baked under the above conditions giving a finish about 2.2 mils in thickness having the same properties as above including excellent metallic glamour. The lacquer is useful as a high quality automotive finish.

EXAMPLE 2

An acrylic polymer dispersion is prepared as follows:

| | Parts by Weight |
|---|---|
| Portion 1 | |
| Methyl methacrylate monomer | 627.1 |
| Diethyl aminoethyl methacrylate monomer | 10.8 |
| Allyl methacrylate monomer | 1.6 |
| Methanol | 35.0 |
| Toluene | 200.0 |
| 2-Ethyl hexanol | 268.3 |
| Portion 2 | |
| Methyl methacrylate monomer | 35.0 |
| Azobisisobutyronitrile | 3.3 |
| Portion 3 | |
| Methyl methacrylate monomer | 428.3 |
| Allyl methacrylate monomer | 3.8 |
| Methanol | 40.0 |
| Isobutyrate ester of 2,2,4-trimethyl-1,3-pentanediol | 310.0 |
| Azobisisobutyronitrile | 5.3 |
| Portion 4 | |
| 2-Ethylhexyl acrylate monomer | 100.0 |
| Methyl methacrylate monomer | 22.5 |
| Methanol | 15.0 |
| Isobutyrate ester of 2,2,4-trimethyl-1,3-pentanediol | 62.1 |
| 75% solution of t-butylperoxy pivalate in mineral spirits | 1.5 |
| Portion 5 | |
| 2-Ethylhexyl acrylate monomer | 100.0 |
| Methyl methacrylate monomer | 15.0 |
| 2-Ethyl hexanol | 55.0 |
| 75% solution of t-butylperoxy pivalate in mineral spirits | 1.5 |
| Portion 6 | |
| Methyl methacrylate monomer | 62.1 |
| 2-Ethyl hexanol | 40.0 |
| Azobisisobutyronitrile | 1.4 |
| 75% solution of t-butylperoxy | 0.7 |

-continued

| | Parts by Weight |
|---|---|
| pivalate in mineral spirits | 5 |
| Portion 7 | |
| Aliphatic hydrocarbon (petroleum fraction having essentially the same evaporation rate as mineral spirits but limited to 8% of 8 carbon atom aromatics and above, aniline point measured by ASTM-D 1012-62 of 60 to 67° C.) | 770.0 |
| Portion 8 | |
| Aliphatic hydrocarbon (described above) | 200.0 |
| 75% solution of t-butyl peroxy pivalate in mineral spirits | 1.2 |
| Total | 3416.5 |

Portion 1 is charged into a reaction vessel equipped with a stirrer, reflux condenser, thermometer, heat source and a nitrogen inlet. During the reaction, the constituents in the vessel are under constant agitation. Portion 1 is heated to its reflux temperature and held for 5 minutes at this temperature. The heat source is turned off. The heat resulting from the reaction maintains the temperature of the reaction mixture. Portion 2 is added to the reaction mixture and the mixture is held for 10 minutes at this reaction temperature. Portion 3 is added to the reaction mixture at a uniform rate over a 90 minute period and then the reaction mixture is held at its reaction temperature for 15 minutes. Portion 4 is added to the reaction mixture and held at its reaction temperature for 15 minutes. Portion 5 is added to the reaction mixture at a uniform rate over a 35 minute period. Portion 6 is then added at a uniform rate over a 20 minute period and held at its reaction temperature for an additional 20 minutes. Portion 7 is then added at a uniform rate over a 50 minute period. Portion 8 is then added over a 50 minute period and the reaction mixture is cooled to 50° C. and then filtered.

The resulting acrylic polymer dispersion has a polymer weight solids content of 40% and contains about 35% of a polymer of methyl methacrylate/allyl methacrylate/diethyl aminoethyl methacrylate in a weight ratio of about 98.4/0.6/1.0 and has a weight average molecular weight of about 110,000, 15% of a copolymer of 2-ethylhexyl acrylate/methyl methacrylate in a 1/1 weight ratio having a weight average molecular weight of about 30,000 and 50% of a graft copolymer of the above polymer which forms the backbone of the graft copolymer and the above copolymer which forms side chains of the graft copolymer.

A blue metallic high solids acrylic dispersion lacquer is formed using the same constituents as used in Example 1 except the above prepared acrylic polymer dispersion is substituted for the acrylic polymer dispersion of Example 1. The lacquer is reduced as in Example 1, spray applied to phosphatized primed and sealed steel panels described in Example 1 and baked under the same conditions as in Example 1. The resulting finish is about 2.2 mils thick and has the same properties as the finish of Example 1 including excellent metallic glamour.

We claim:

1. A process for preparing a high solids acrylic dispersion lacquer coating composition having an acrylic polymer binder content of about 25–45% by weight in a nonaqueous medium; wherein the acrylic polymer binder consists essentially of (1) 25–45% by weight, based on the weight of the binder, of Polymer A comprising about 90–99.5% by weight, based on the weight of Polymer A, of polymerized methyl methacrylate and about 0.1–5% by weight, based on the weight of Polymer A, of polymerized allyl methacrylate and 0.4–5% by weight, based the weight of Polymer A, of polymerized alkyl amino alkyl methacrylate and having a weight average molecular weight, measured by gel permeation chromatography, of about 90,000–130,000;

(2) 5–25% by weight, based on the weight of the binder, of Copolymer B comprising about 40–60% by weight, based on the weight of Copolymer B, of polymerized methyl methacrylate and 40–60% by weight, based on the weight of Copolymer B, of polymerized alkyl acrylate having 6–12 carbon atoms in the alkyl group and having a weight average molecular weight, measured as above, of about 20,000–40,000; and (3) 40–60% by weight, based on the weight of the binder, of a graft copolymer of Polymer A which forms a backbone of the graft copolymer and Copolymer B attached to the backbone which forms side chains of the graft copolymer; and wherein the nonaqueous medium comprises (a) an aliphatic solvent which is at 25° C. a nonsolvent for Copolymer B; and (b) a coalescing solvent which at 50° C. and above is a solvent for the binder and at 25° C. is a nonsolvent for the binder;

wherein the process comprises the following steps:

Step (1) adding about 50–70% by weight of the monomers for Polymer A and the backbone of the graft copolymer to a polymerization vessel with coalescing solvent, bridging solvent and low boiling solvent selected from the group of methanol or a blend of acetone and petroleum ether and maintaining a reflux temperature;

Step (2) adding about 0.1–2% by weight, based on the weight of Polymer A and the backbone of the graft copolymer, of an azo polymerization catalyst with coalescing solvent to the reaction mixture of step (1) and polymerizing said monomers;

Step (3) adding at a substantially uniform rate the remaining 30–50% by weight of the monomers for Polymer A and the backbone of the graft copolymer and a coalescing solvent and about 0.1–2% by weight, based on the total weight of the monomers for Polymer A and the backbone of the graft copolymer, of an azo polymerization catalyst while maintaining the reflux temperature and polymerizing said monomers;

Step (4) adding about 40–60% by weight of monomers of Copolymer B and the side chains of the graft copolymer and about 0.5–2% by weight, based on the weight of the above monomers, of a peroxy polymerization catalyst while maintaining the reflux temperature and polymerizing said monomers;

Step (5) adding at a substantially uniform rate the remaining 40–60% by weight of the monomers of Step (4) with the above same amount of peroxy polymerization catalyst while maintaining the reflux temperature and polymerization said monomers;

Step (6) adding at a substantially uniform rate, about 2–10% by weight, based on the weight of the monomers for Polymer A, Copolymer B and the graft copolymers, of methyl methacrylate monomer with about 0.1-1% by weight of azo polymerization catalyst and the above peroxy polymerization catalyst while maintaining the refux temperature and polymerizing said monomers;

Step (7) adding at a substantially uniform rate about 15-25% by weight, based on the weight of the resulting reaction mixture of the above steps, of an aliphatic hydrocarbon solvent which is a nonsolvent for Polymer A and the backbone of the graft copolymer; and Step (8) adding about 5-10% by weight, based on the weight of the reaction mixture, of the aliphatic hydrocarbon solvent of Step (7) containing about 0.1-10% by weight, based on the weight of the solvent, of the peroxy polymerization catalyst and polymerizing any residual monomers and cooling the resulting composition to an ambient temperature.

2. The process of claim 1 in which the monomers of Polymer A consist essentially of methyl methacrylate, allyl methacrylate and diethyl amino methacrylate.

3. The process of claim 1 in which the monomers of Copolymer B consist essentially of methyl methacrylate and 2-ethylhexyl acrylate.

4. The process of claim 1 in which the monomers of Polymer A consist essentially of 90-99.5% by weight of methyl methacrylate, 0.1-5% by weight of allyl methacrylate and 0.4-5% by weight of diethyl amino ethyl methacrylate and the resulting Polymer A has a weight average molecular weight of about 100,000-115,000.

5. The process of claim 4 in which the monomers of Copolymer B consist essentially of about 40-60% by weight of methyl methacrylate and 40-60% by weight of 2-ethylhexyl acrylate and the resulting Copolymer B has a weight average molecular weight of about 20,000-40,000.

6. The process of claim 5 in step (1) wherein the coalescing solvent is diethylene glycol monohexyl ether, low boiling solvents are a blend of acetone and petroleum ether and a bridging solvent of toluene is used with said coalescing solvent and low boiling solvent.

7. The process of claim 5 in step (1) wherein the coalescing solvent is 2-ethyl hexanol, low boiling solvent is methanol and a bridging solvent of toluene is used with said coalescing solvent and low boiling solvent.

8. The process of claim 1 wherein the resulting nonaqueous medium comprises about
 (a) 35-65% by weight, based on the weight of the nonaqueous medium of an aliphatic solvent; and
 (b) 35-65% by weight of coalescing solvent.

* * * * *